United States Patent [19]

Ammons

[11] 4,101,529
[45] Jul. 18, 1978

[54] HARD, OPTICALLY CLEAR POLYURETHANE ARTICLES

[75] Inventor: Vernon G. Ammons, Glenshaw, Pa.

[73] Assignee: PPG Industries, Inc., Pittsburgh, Pa.

[21] Appl. No.: 655,184

[22] Filed: Feb. 4, 1976

[51] Int. Cl.² ............................................. C08G 18/28
[52] U.S. Cl. ...................................... 528/67; 528/85
[58] Field of Search .................. 260/2.5 AP, 2.5 AM, 260/2.5 AT, 77.5 AM, 77.5 AT

[56] References Cited

U.S. PATENT DOCUMENTS

| | | | |
|---|---|---|---|
| 3,243,414 | 3/1966 | DeWitt et al. | 260/77.5 AM |
| 3,356,650 | 12/1967 | McElroy | 260/77.5 AM |
| 3,620,905 | 11/1971 | Ahramjian | 260/77.5 AT |
| 3,755,262 | 8/1973 | Slagel | 260/77.5 AM |
| 3,764,457 | 10/1973 | Chang et al. | 260/77.5 AP |
| 3,791,914 | 2/1974 | Ammons et al. | 260/18 TN |
| 3,965,057 | 6/1976 | Ammons et al. | 260/77.5 AN |

OTHER PUBLICATIONS

"Polyurethanes, Chemistry and Technology" Part I by Sounders et al., pp. 264–267, 1966, Interscience Publ. N.Y.

Primary Examiner—Eugene C. Rzucidlo
Attorney, Agent, or Firm—William J. Uhl

[57] ABSTRACT

Polyurethane compositions characterized by being heat curable to yield hard, impact-resistant articles having a high heat distortion temperature are disclosed. The cured polyurethane articles are transparent and also hydrolytic and UV light stable as well as being abrasion resistant. The polyurethane is prepared from a cycloaliphatic polyisocyanate, low molecular weight active hydrogen-containing material and optionally a polycarbonate diol. The weight percentage of the urethane moieties and the crosslinked density are carefully controlled so as to provide the proper balance of physical properties, particularly between hardness, flexibility and heat distortion temperature. The polyurethane articles are particularly useful in glazing applications such as aircraft glazing.

21 Claims, No Drawings

HARD, OPTICALLY CLEAR POLYURETHANE ARTICLES

BACKGROUND OF THE INVENTION

1. Field of the Invention

This invention relates to polyurethane compositions and more particularly relates to polyurethane compositions which are heat curable to yield hard, impact-resistant articles which are useful in glazing applications.

2. Brief Description of the Prior Art

Hard, rigid, plastic materials such as polycarbonate and acrylics have been gaining considerable favor as substitutes for glass. The plastics are lighter in weight, more flexible and have sufficient strength for many applications in which glass is used. An example of where hard, rigid plastics are being used as a substitute for glass is in aircraft glazing where both polycarbonate and acrylics have enjoyed widespread acceptance. Unfortunately, there are some serious disadvantages associated with both polycarbonates and acrylics. Polycarbonates scratch easily and if directly exposed soon become difficult to view through. Acrylics, although not as scratchable as polycarbonates, do not have the physical properties of the polycarbonates such as heat distortion temperature and impact resistance.

The present invention overcomes many of these shortcomings of the plastics of the prior art and provides for a new hard plastic material which has a more desirable blend of physical properties than conventional polycarbonate and acrylics. The plastics of the present invention are polyurethanes prepared from cycloaliphatic polyisocyanates, low molecular weight active hydrogen-containing materials and optionally polymeric polycarbonate diols; the weight percentages of urethane moieties, cyclohexyl moieties and the extent of crosslinking in the polymer is carefully controlled so as to properly balance the physical properties.

SUMMARY OF THE INVENTION

According to the present invention, polyurethane compositions characterized by being heat curable to yield hard, impact-resistant articles are disclosed. The polyurethanes have a heat distortion temperature according to ASTM D-648 of at least 190° F. (88° C.) and comprise the reaction product of a cycloaliphatic polyisocyanate, a low molecular weight active hydrogen-containing material having only two active hydrogens per molecule, a low molecular weight active hydrogen-containing material having at least three active hydrogens per molecule and optionally a polymeric polycarbonate diol. The equivalent ratio of the cycloaliphatic diisocyanate to the low molecular weight active hydrogen-containing materials and the polymeric polycarbonate diol is about 1:1, and the equivalent ratio of low molecular weight active hydrogen-containing material having only two active hydrogens per molecule to low molecular weight active hydrogen-containing material having at least three active hydrogens per molecule is within the range of 0.5 to 10:1. The reaction product has a calculated weight percentage of urethane linkages ($W_u$) of at least 20 percent and a calculated molecular weight between branch points ($W_b$) of 600–4,000.

The polyurethanes of the present invention are substantially free of ether linkages and when cured have Shore D hardness at room temperature of at least 75 and Gardner impact resistance of at least 40 inch-pounds at ⅛ inch thick samples. The cured articles are clear, having a luminous transmittance of at least 80 percent, and less than 2 percent haze and show no visual change after 1,000 hours of light and water exposure according to ASTM D-1499-64.

DETAILED DESCRIPTION

As mentioned above, the polyurethanes of the present invention are prepared with cycloaliphatic polyisocyanates because of superior properties in the resultant cured products. For example, the products prepared with aromatic polyisocyanates have poorer UV light and thermal stability than the products of the present invention, and products prepared entirely with linear aliphatic polyisocyanates have poorer heat distortion temperatures than the products of the present invention.

Examples of suitable cycloaliphatic diisocyanates are dinuclear cyclic aliphatic diisocyanates which are formed through an alkylene group of from 1 to 3 carbon atoms, inclusive, and which can be substituted with nitro, chlorine, alkyl, alkoxy and other groups which are not reactive with hydroxyl groups (or active hydrogens) providing they are not positioned to render the isocyanate group unreactive. Specific examples of the preferred dinuclear cyclic aliphatic diisocyanates are 4,4'-isopropylidene-bis-(cyclohexyl isocyanate) and 4,4'-methylene-bis-(cyclohexyl isocyanate), which is preferred and commercially available in a stereo:isomer ratio of 55 percent trans and 45 percent cis from E. I. DuPont de Nemours and Company under the trademark HYLENE W.

Besides dinuclear cyclic aliphatic diisocyanates, mononuclear cyclic aliphatic diisocyanates such as 1,4-cyclohexyl diisocyanate, 1,4-cyclohexyl dimethyl diisocyanate and isophorone diisocyanate can also be employed.

Thio isocyanates corresponding to the above diisocyanates can be employed as well as mixed compounds containing both an isocyanate and a thio isocyanate group. Diisocyanates used herein include thio isocyanates and compounds containing both an isocyanate and a thio isocyanate group.

The low molecular weight active hydrogen-containing material which contains only two active hydrogens per molecule is incorporated into the composition to provide the resultant cured articles with high impact resistance and high heat distortion temperatures. The activity of the hydrogen is determined by the Zerewitinoff Test as described by Kohler in the *Journal of the American Chemical Society*, 49 3181 (1927). These materials are preferably linear. The molecular weights of these materials are preferably less than 250. Examples of suitable active hydrogen-containing materials are aliphatic diols containing from 2 to 10 carbon atoms such as ethylene glycol, 1,3-propanediol, 1,4-butanediol and 1,6-hexanediol and 1,8-octanediol, with 1,4-butanediol being preferred.

The low molecular weight active hydrogen-containing compound containing at least three active hydrogens per molecule is incorporated into the composition to provide crosslinking which results in high heat distortion temperatures and improved impact resistance; the activity of the hydrogen being determined according to the Zerewitinoff Test described above. The molecular weights of these materials are preferably less than 250 and preferably contain from 3 to 5 active hydrogens per molecule. Examples of suitable materials are trimethylolpropane, trimethylolethane, trimethylolheptane, 1,2,4-butanetriol and 1,2,6-hexanetriol.

Optionally, a polymeric polycarbonate diol can be included in the formulation. With many formulations of the invention, the inclusion of a polycarbonate diol has been found to increase impact resistance. However, this increased impact resistance is at the expense of heat distortion temperature. Thus, when using a polycarbonate diol in the practice of the present invention, somewhat lower heat distortion temperatures are to be expected, although impact resistance can be increased.

Polycarbonate diols used in the practice of the invention are preferably poly(alkylenecarbonate) diols having a molecular weight within the range of 700-2,000. The alkylene group contains from 5 to 10 carbon atoms and can be a linear alkylene group or a cycloalkylene group or a mixed linear-cyclo-alkylene group. Examples of alkylene groups are hexylene, octylene, decylene, cyclohexylene and cyclohexyldimethylene. Polyalkylene carbonate diols can be readily synthesized according to the following reaction scheme:

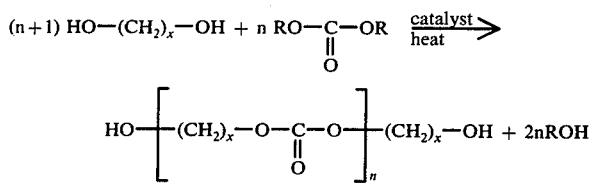

where $n$ is equal to about 5 to 15, $x$ is equal to 5 to 10, and R is lower alkyl group containing 1 to 4 carbon atoms or aryl groups.

The reaction takes place under reflux conditions with the continuous elimination of ROH. During the last stages of the reaction, the remaining residual ROH is vacuum stripped. As shown in the above reaction scheme, a hydroxy-terminated alkylene diol can be reacted with a di- lower alkyl carbonate such as methyl, ethyl, n-propyl and n-butyl carbonate or diaryl carbonate such as diphenyl carbonate or dinaphthyl carbonate, either by heating the reactants alone or with the use of ester interchange catalysts such as tetrabutyl titanate. The classical alkali alkoxide-type catalyst must be avoided because of adverse effects it could have when using the polycarbonate to synthesize the polyurethane. Besides the preferred dialkyl or diaryl carbonates, the poly(alkylenecarbonate) diol could be prepared by the reaction of a hydroxy-terminated alkylene diol with phosgene or bischloroformate. Poly(cyclohexyldimethylcarbonate) diol is the preferred poly(alkylenecarbonate) diol used in the practice of the invention. Also, a mixed poly(1,6-hexylene-cyclohexyldimethylenecarbonate) diol can also be used.

The proportions of the polyisocyanate and active hydrogen-containing compounds which are reacted with one another should be carefully selected and proportioned to form articles with the desirable properties of the invention. Accordingly, the various reactants should be chosen and proportioned to give resultant polyurethane articles having a calculated urethane content ($W_u$) of at least 20 percent and preferably at least 24 percent by weight. Also, the reactants should be chosen so that the calculated molecular weight between the branching points ($W_b$) is within the range of 600 to 4,000, preferably from 620 to 1,175. In the most preferred formulations of the invention, the percentage by weight of the cycloaliphatic structural units ($W_c$) is preferably within the range of from 45 to 50.

The $W_u$ is the percentage by weight of the urethane linkages present in the polymer and can be calculated by determining the total number of equivalents, and from this the total weight of all reactants, and dividing the total weight of the urethane linkages obtainable from these reactants by the total weight of the reactants themselves.

The following example will further explain the calculation. In Example I which follows, a hard polyurethane article of the invention was prepared by reacting 0.7 equivalents of 1,4-butanediol, 0.3 equivalents of trimethylolpropane and one equivalent of 4,4'-methylene-bis-(cyclohexyl isocyanate) (HYLENE W). The equivalent weight of the 1,4-butanediol is 45, the equivalent weight of the trimethylolpropane is 47 (corrected for impurities) and the equivalent weight of the HYLENE W is 131. Therefore, the actual weight of ingredients used is 31.5 parts by weight of 1,4-butanediol, 14.1 parts by weight of trimethylolpropane and 131 parts by weight of HYLENE W or a total reactant weight of 176.6 parts by weight. Now, one equivalent of HYLENE W will yield one equivalent of urethane linkage. The equivalent weight of a urethane linkage is 59 so that the total weight of the urethane linkages determined by multiplying the equivalent weight by the number of equivalents would also be 59. Thus, the total weight of the urethane linkage, 59, divided by the total weight of the reactants, 176.6, multiplied by 100 to convert to percentages would give a percentage by weight of urethane linkage of 33.4 percent by weight.

In an analogous manner, the percentage by weight of cyclohexyl structures could be calculated. In Example I, the only material contributing cyclohexyl moieties is the HYLENE W. One equivalent of HYLENE W would yield one equivalent of cyclohexyl moiety which has an equivalent weight of 82. Thus, the total weight of cyclohexyl moiety would be equal to 82 and this divided by the total weight of reactants or 176.6 would yield a $W_c$ of 46.6 percent.

$W_b$ is an expression of average chain length expressed as the average molecular weight between branching points. The smaller the value of $W_b$, the greater the crosslinked density of the formula. The method of calculating $W_b$ can be seen from the following example. Consider Example I discussed above and the determination of $W_u$ and $W_c$.

| Ingredient | Equivalent Weight | Number of Equivalents |
|---|---|---|
| 1,4-butanediol | 45 | 0.700 |
| trimethylolpropane | 47* | 0.300 |
| HYLENE W | 131 | 1.000 |

*This equivalent weight allows for impurities. Absolutely pure trimethylolpropane has an equivalent weight of 44.7.

Consider that the 1,4-butanediol reacts with the HYLENE W to give an NCO-terminated prepolymer; and that, in turn, this average prepolymer is tied together via the trifunctional trimethylolpropane to give the final branched and/or network polymer. Let Q be the mole ratio of HYLENE W to 1,4-butanediol, then $$Q = \frac{0.50}{0.35} = 1.429.$$

It is known from *Principles of Polymer Chemistry* by Paul J. Flory (1967), Cornell University Press, Ithaca, New York, and Gritsenko in an article entitled "Polycondensation Stoichiometry" appearing in *J. Macromol. Sci. Chem.,* Vol. A9, No. 3, 1975, that $$\overline{P}_n = \frac{Q+1}{Q-1}$$

where $\overline{P}_n$ is the number average degree of polymerization. Thus, for the above formulation $$\overline{P}_n = \frac{2.429}{0.429} = 5.662.$$

Thus, the average number of repeating units for the prepolymer is $$n = \frac{5.662 - 1}{2} = 2.33.$$

The prepolymer is thus

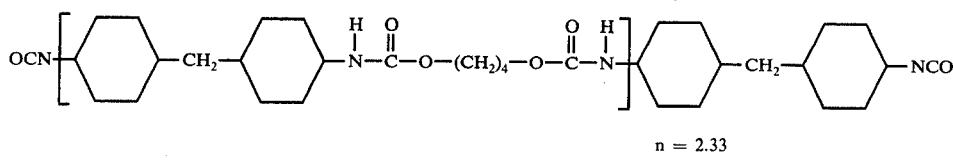

n = 2.33

In the above structural formula, the repeating unit weight is 262 + 90 = 352. The end group weight is 262 and thus the average molecular weight of the prepolymer would be equal to 352 (2.33) + 262 = 1082.16.

Schematic representation of the final prepolymer would be somewhat as follows:

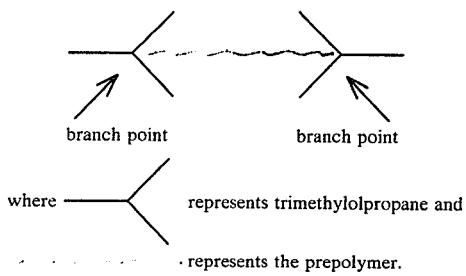

where ———< represents trimethylolpropane and

· · · · represents the prepolymer.

It can be seen that the molecular weight between branch points ($W_b$) comes from the molecular weight of the average prepolymer above and 2/3 of the molecular weight of the trimethylolpropane and thus for Example I, $W_b$ is equal to 1082.16 + 89.4 = 1171.56.

In general, to obtain polyurethane articles with desired properties, the equivalent ratio of cycloaliphatic polyisocyanate to active hydrogen-containing compounds contained in the reactants should be about 1:1, and the reaction carried out to completion as evidenced by an IR scan on the product indicating no free NCO groups. Complete reaction will produce a high molecular weight product. The equivalent ratio can be varied slightly, that is, NCO/OH equivalent ratios of 1 to 1.05:1, but should be kept as close to 1:1 as possible so as to obtain superior products.

To obtain the desired values of $W_u$ and $W_b$, the equivalent ratio of active hydrogen-containing compounds relative to one another should be carefully controlled. Thus, the ratio of low molecular weight active hydrogen-containing compound which contains only two active hydrogens per molecule to low molecular weight active hydrogen-containing compound containing at least three active hydrogens per molecule should be within the range of 0.5 to 10.0:1. Using ratios much lower than 0.5:1 is undesirable because the resultant cured products would be brittle; whereas using ratios higher than 10:1 is undesirable because the heat distortion temperature of the resultant cured products would be poor.

Where a polycarbonate diol is included in the formulations, the equivalent ratio of active hydrogen-containing compounds containing only two active hydrogens per molecule (i.e., low molecular weight material plus polycarbonate diol) to low molecular weight active hydrogen-containing compound containing at least three active hydrogens per molecule should be within the range of 0.8 to 4.0:1. Using lower ratios than that recommended by the above range is undesirable because the resultant cured products would be brittle; whereas using ratios higher than that recommended in the above range is undesirable because the heat distortion temperature of the resultant cured products would be poor.

The polyurethanes of the present invention can be prepared by the "one-shot" method which is well known in the art. In the one-shot method, all the ingredients, that is, polyisocyanate, and all the active hydrogen-containing materials, and catalyst if needed and optional ingredients such as ultraviolet light stabilizers are mixed together. The mixing is preferably conducted under anhydrous conditions with dry reactants such as in a nitrogen atmosphere and atmospheric pressure and at a temperature between about 45 and about 90° C. If polycarbonate diols are used, they are dried before reaction, usually to a moisture content of between about 0.01 to 0.05 percent.

The diisocyanate is usually added to the reaction vessel first, followed by the rapid addition of the active hydrogen-containing materials. Agitation is vigorous and the temperature of the reaction mixture is maintained within the above-described range until the initially two-phase system becomes homogeneous. The mixture is then preferably vigorously agitated and degassed for a period of at least about 8 minutes during which time the pressure is reduced from atmospheric to about 3 millimeters of mercury. Reduction in pressure facilitates the removal of dissolved gases such as air and carbon dioxide. The ingredients are then removed from the reaction kettle and are further processed and reacted. The reaction continues until there is substantially no free NCO groups which can be conveniently determined by an infrared scan. The free NCO content of the polyurethane articles of the invention will be less than 0.05 percent by weight isocyanate and preferably less than 0.01 percent by weight.

The products of the invention are thermosetting in nature and must be handled as such for curing. Thus, when it is desirable to make articles in sheet form such as for aircraft glazing, the resinous mixture in the reaction vessel should be cast and cured in place. This process involves removing the ingredients from the reaction kettle and casting the material as a liquid in the casting cell permitting it to cure in place within the casting cell. See U.S. Pat. No. 3,522,142 to Wismer et al for casting and curing thermosetting polyurethanes in place. A release coating such as TEFLON or the like should be imposed on the interior surface of the casting cell to release the casting from the cell.

It is not recommended that the polyurethanes of the present invention be prepared by the prepolymer method because of processing difficulties.

Catalysts may be employed, such as, for example, a tin catalyst such as dibutyltin dilaurate, stannous octoate and butyl stannoic acid. Catalyst concentrations range from 0.005 to 0.015 percent by weight based on total formulation weight. Where catalyst is employed, a pot life extender such as stearyl acid phosphate should be used.

When properly formulated and reacted as described above, hard, flexible polyurethane articles are produced. The articles are optically clear, being hydrolytic and UV light stable, having high heat distortion temperatures and being abrasion resistant. Further, the articles prepared with the preferred formulations have surprisingly high tensile strengths for plastics, along with good elongation. Also, the polyurethane articles prepared according to the invention are extremely durable retaining at least 70 and up to 95 percent of their original tensile strength after 1,000 hours Weather-O-Meter exposure.

As mentioned above, cured articles of the invention are optically clear. They have a minimum light transmission of at least 80 percent and preferably at least 86.5 percent or above (Illuminant A, tungsten lamp 2840° K) and less than 2 percent haze (ANSI Code Z-26.1, 1966, Test No. 18). The percentage light transmission and the percent haze can be measured by a Hunter pivotable sphere haze meter.

The polyurethanes of the present invention have outstanding weather characteristics as measured by UV light stability and hydrolytic stability. For example, the polyurethanes of the invention showed no visual change upon Fade-O-Meter ® and Weather-O-Meter ® exposure after at least 1,000 hours. The Fade-O-Meter and Weather-O-Meter exposures are conducted in conformance with ASTM procedures. Accordingly, the Fade-O-Meter exposure is conducted according to ASTM G-25-70, Method A. The exposure device was a Fade-O-Meter, Type FDA-R, Serial No. F02951, manufactured by Atlas Electric Devices Co., Chicago, Illinois. The light source is a carbon arc lamp enclosed in a fused silica globe. The operating temperature of the Fade-O-Meter (black panel) is 140° F. (60° C.) and the instrument is operated with no water in the atomizing unit. Sample sizes are 2½ inches by ⅛ inch (6.35 cm by 15.24 cm by 0.32 cm).

Weather-O-Meter exposure is conducted according to ASTM D-1499-64. The exposure device is a Weather-O-Meter, Type DMC, Serial No. WO-1305. The type of light source is a twin carbon arc lamp enclosed in a fused silica globe. The operating black panel temperature is 140° F. (60° C.). The spray of water is deionized water at a temperature of about 70° F. (21° C.). The number and type of water spray nozzles which are used are four No. 50 nozzles.

The heat distortion temperature of the products of the invention should be at least 190° F. (88° C.) and preferably above 200° F. (93° C.), as determined according to ASTM-D-648.

The abrasion resistance of the polyurethane articles of the invention is determined on a Taber abrader. Accordingly, after 100 cycles on a Taber abrader, using a CS-10F abrasion wheel with 500 grams of weight, the polyurethane articles of the invention (sample size 3 inches by 3 inches by ⅛ inch (7.62 cm by 7.62 cm by 0.32 cm) should have less than an 18 percent increase in haze.

The polyurethane articles of the invention are extremely hard but yet flexible. Hardness of the polyurethanes can be determined by the Shore hardness and accordingly, articles of the invention have a Shore D hardness at room temperature of at least 75 and preferably at least 80. The flexibility of the materials can be determined on a Gardner Variable Impact Tester and accordingly, the polyurethane articles of the invention (2 inch by 2 inch by ⅛ inch (5.08 cm by 5.08 cm by 0.32 cm) specimens) should have a Gardner impact of at least 40 and preferably at least 60 inch-pounds.

The tensile strength of the polyurethane articles of the invention is surprisingly high for plastics. Accordingly, the preferred formulations of the invention have tensile strengths of at least 12,000 pounds per square inch as determined according to ASTM D-638, with about a 40 percent elongation. Further, this tensile strength is maintained even after 1,000 hours exposure to a Weather-O-Meter as described above in that the retained tensile strength is about 70 to 95 percent of its original value.

The polyurethanes of the present invention are desirable for a wide variety of uses. They are particularly useful as glazing materials for aircraft safety glass windows.

Besides aircraft glazing, the polyurethanes of the invention in sheet form can be used in architectural applications and can be tinted or made opaque by pigmenting if desired. In such applications, the polyurethanes of the invention are usually in sheet form and may be used alone or laminated to other materials such as elastomeric sheet materials such as polyvinyl butyral and elastomeric polyurethanes. Also, the polyurethanes of the invention can be used for optical lenses since they have been found to be optically clear and unaffected by ultraviolet light and humidity exposure and are amazingly abrasion resistant.

the polyurethanes of the invention can be used in sheet form and will vary in thickness form about 2 to 500 mils, although somewhat thinner and thicker sheets can be used, depending upon the application.

For aircraft use, the polyurethanes of the present invention usually vary between ⅛ inch and ½ inch (0.32 cm to 1.27 cm).

EXAMPLES 1 - 3

A series of polyurethanes were prepared with 4,4'-methylene-bis-(cyclohexyl isocyanate) (HYLENE W), 1,4-butanediol and trimethylolpropane. The procedure for preparing these polyurethanes was as follows:

HYLENE W was charged to a reaction kettle at room temperature which is equipped with a magnetic stirrer and heating mantle, and fitted to pull vacuum and break vacuum with a dry nitrogen source. A vacuum (i.e., 2 mm of Hg pressure) was pulled and broken with dry nitrogen to impose a nitrogen atmosphere in the reaction kettle.

While stirring at 180° F. (82° C.), a solution of trimethylolpropane in 1,4-butanediol heated to 185° F. (85° C.) under house vacuum was added slowly to the reaction kettle. The heat is turned off and stirring is continued until a clear mixture is obtained and then for another five minutes. If necessary, the kettle is removed from the heating mantle so that the temperature does not exceed 190° F. (88° C.).

The reaction mixture is degassed for 10 minutes and then cast into casting cells which are preheated to 290° F. (143° C.). The cast formulation is then cured for 48 hours at an oven temperature of 290° F. (143° C.).

The charge ratio, as well as the values for $W_u$, $W_c$ and $W_b$ and the physical properties of the final polyurethane articles are shown in Table I below.

means to break vacuum with dry nitrogen. While stirring pump vacuum was pulled and then broken with dry nitrogen to impose a nitrogen atmosphere in the reaction kettle.

While stirring at 175° F. (79° C.), a solution of trimethylolpropane dissolved in 1,4-butanediol and heated to 175° F. (79° C.) under house vacuum was added slowly to the reaction kettle.

Stearyl acid phosphate (additive to extend pot life) is dissolved in the HYLENE W with gentle heating and stirring and heated to 175° F. (79° C.) under house vacuum (i.e., about 190 mm of Hg). The vacuum is then broken with dry nitrogen and added to the reaction kettle from which the heating mantle was previously removed.

Table I

| Ingredients | Polyurethane Formulations and Their Properties | | | | | | | |
|---|---|---|---|---|---|---|---|---|
| | Example A | | Example 1 | | Example 2 | | Example 3 | |
| | Equivalent Ratio | Weight Ratio | Equivalent Ratio | Weight Ratio | Equivalent Ratio | Weight Ratio | Equivalent Ratio | Weight Ratio |
| 1,4-butanediol | 1.000 | 25.57 | 0.900 | 23.02 | 0.700 | 17.84 | 0.431 | 10.94 |
| trimethylolpropane | — | — | 0.100 | 2.54 | 0.300 | 7.98 | 0.569 | 15.10 |
| HYLENE W | 1.000 | 74.43 | 1.00 | 74.44 | 1.000 | 74.18 | 1.000 | 73.96 |
| $W_u$ | 33.52% | | 33.52% | | 33.40% | | 33.31% | |
| $W_c$ | 46.59% | | 46.59% | | 46.61% | | 46.29% | |
| $W_b$ | — | | 3520 | | 1172 | | 618 | |
| Gardner Impact | 36 in./lbs. | | 69 in./lbs. | | 65 in./lbs. | | 43 in./lbs. | |
| Heat Distortion Temperature, 266 psi | 194° F. (90° C.) | | 207° F. (97° C.) | | 235° F. (113° C.) | | >250° F. (>121° C.) | |
| Tensile Strength/Elongation | — | | — | | 13,031 psi/40% | | — | |
| Tensile Strength/Elongation after 1000 hours Weather-O-Meter Exposure | — | | — | | 12,110 psi/70% | | — | |
| Taber Abrasion Increase in Haze[1] | 18.87 | | — | | 15 | | — | |
| Hardness, Shore D, room temperature | 87 | | 89 | | 89 | | 90 | |

[1]Increase in haze before and after abrasion.

EXAMPLES 4 – 9

A series of modified polyurethanes were prepared from a poly(alkylenecarbonate) diol, 1,4-butanediol, trimethylolpropane and HYLENE W. The procedure for preparing these polyurethanes was as follows:

A poly(cyclohexanedimethylenecarbonate) diol having a molecular weight of 904 was melted and charged to a reaction kettle equipped with an overhead stirrer, heating mantle, means to pull pump vacuum and a The mixture was then given 7-minute degassing via full pump vacuum (i.e., 2 mm of Hg) and the vacuum broken with dry nitrogen.

The formulation was then cast into casting cells preheated to 290° F. (143° C.) and cured for 24 hours at 290° F. (143° C.).

The charge ratio as well as the values for $W_u$, $W_c$ and $W_b$ and the physical properties of the final polyurethane articles are shown in Table II below.

Table II
Modified Polyurethane Formulations and Their Properties

| Ingredients | Example 4 Equivalent Ratio | Example 4 Weight % | Example 5 Equivalent Ratio | Example 5 Weight % | Example 6 Equivalent Ratio | Example 6 Weight % | Example 7 Equivalent Ratio | Example 7 Weight % | Example 8 Equivalent Ratio | Example 8 Weight % | Example 9 Equivalent Ratio | Example 9 Weight % | Example B Equivalent Ratio | Example B Weight % |
|---|---|---|---|---|---|---|---|---|---|---|---|---|---|---|
| Polycarbonate Diol[1] | 0.245 | 40.16 | 0.187 | 33.47 | 0.151 | 28.66 | 0.1096 | 22.32 | 0.250 | 38.31 | 0.500 | 59.40 | — | — |
| Polycaprolactone Diol[2] | — | — | — | — | — | — | — | — | — | — | — | — | 0.169 | 34.20 |
| 1,4-butanediol | 0.510 | 8.28 | 0.387 | 6.88 | 0.313 | 5.90 | 0.2262 | 4.59 | — | — | — | — | — | — |
| Trimethylolpropane | 0.245 | 4.18 | 0.426 | 7.90 | 0.536 | 10.55 | 0.6642 | 14.07 | 0.750 | 13.08 | 0.500 | 6.17 | 0.831 | 15.11 |
| HYLENE W | 1.000 | 47.38 | 1.000 | 51.75 | 1.000 | 54.89 | 1.000 | 59.02 | 1.000 | 48.61 | 1.000 | 34.43 | 1.000 | 50.69 |
| Stearyl Acid Phosphate[3] percent | 0.10 | | 0.10 | | 0.10 | | 0.10 | | 0.10 | | 0.10 | | — | |
| $W_a$ | 21.34% | | 23.3% | | 24.77% | | 26.58% | | 22.45% | | 15.50% | | 22.83% | |
| $W_c$ | 49.61% | | 49.03% | | 48.60% | | 48.04% | | 49.84% | | 51.07% | | 31.73% | |
| $W_b$ | 2262 | | 1178 | | 882 | | 661 | | 1320 | | 1522 | | 1266 | |
| Gardner Impact | 68 in./lbs. | | 64 in./lbs. | | 64 in./lbs. | | 14 in./lbs. | | 23 in./lbs. | | — | | — | |
| Heat Distortion Temperature, 266 psi | 195° F. (91° C.) | | 202° F. (94° C.) | | 212° F. (100° C.) | | 235° F. (113° C.) | | 215° F. (102° C.) | | — | | 145° F. (63° C.) | |
| Hardness, Shore D, room temperature | 87 | | 85 | | 88 | | 89 | | — | | — | | — | |

[1]The polycarbonate diol was poly(cyclohexanedimethylenecarbonate) diol having a molecular weight of 904. The polymer was prepared by reacting 6 moles of cyclohexanedimethanol with 5 moles of diethylcarbonate in the presence of tetrabutyl titanate catalyst.
[2]Polycaprolactone diol having a molecular weight of 1060 formed from ring opening epsilon-caprolactone with 500 molecular weight poly(butylene adipate) diol.
[3]Percent by weight based on total formulation weight.

From Tables I and II above it is seen that heat distortion resistance increases as the crosslink density increases ($W_b$ decreases). In the series of Table I, essentially only $W_b$ is varied and it shows a pronounced effect on heat distortion resistance.

From the series of Table I it is seen that the maximum impact resistance for a non-polycarbonate diol modified polyurethane occurs at a $W_b$ value very close to that of Example 2. Further note how optimum crosslinking promotes impact performance compared to a non-crosslinked thermoplastic formula (Example A).

In comparing Examples 8 and 9 with Examples 4 through 6, it seems the better performance of the polyurethanes of Examples 4 through 6 is due to including 1,4-butanediol as the fourth component of the formula.

Note the direct comparison of Example 8 and Example B. Both have nearly the same $W_b$ values, but Example 8 has much greater heat distortion resistance, probably because of its greater $W_c$ value.

Modification of the polyurethanes with the polycarbonate diol results in the maximum possible impact resistance, but this modification causes a lowering of the heat distortion resistance. Thus, the best possible compromise must be made. In this respect, compare the series of polyurethanes of Table I with those of Table II.

The polyurethanes of Examples 1 through 6 above are extremely hard, having Shore D hardness at room temperature of 82–89. Example 2 shows a Shore D hardness of 89 at room temperature and a Shore D hardness of 65° to 290° F. (143° C.) which is a remarkably small rate of decrease of hardness with temperature.

The polyurethanes above are optically clear having luminous transmissions of at least 80 percent. Further, the polyurethanes of Examples 1 to 7 show no visual change after 1,000 hours exposure to both Weather-O-Meter and Fade-O-Meter.

The polycarbonate diol modifier permits the making of colorless modified hard polyurethanes. The polyester diol (shown as Example B in Table II above) causes the imparting of a small amount of color to the resultant polyurethane article. In addition, the polycarbonate diol employed in the practice of the invention gives the slowest rate of the effect on heat distortion temperature as compared to the polycaprolactone diols shown in Example B of Table II. Comparison of Example 8 with Example B highlights this point, i.e., 215° F. (102° C.) versus only 145° F. (63° C.) heat distortion resistance with the same level of impact resistance.

I claim:

1. A polyurethane composition substantially free of ether linkages characterized by being heat curable to yield hard, impact-resistant articles having a Shore D hardness at room temperature of at least 75, said articles having a heat distortion temperature as determined according to ASTM D-648 of at least 190° F. (88° C.) and showing no visual change when exposed to ultraviolet light in accordance with ASTM G-25-70, Method A, comprising the reaction product of:
    (A) a cycloaliphatic polyisocyanate,
    (B) a low molecular weight active hydrogen-containing material containing only two active hydrogens per molecule,
    (C) a low molecular weight active hydrogen-containing material having at least three active hydrogens per molecule, and optionally,
    (D) a polymeric polycarbonate diol; the equivalent ratio of (B)/(C) being within the range of 0.5 to 10/1, said reaction product having a calculated weight percentage of urethane linkages of at least 20 percent, a calculated molecular weight between branch points of 600–4,000 and the percentage by weight of cycloaliphatic structural units being within the range of 45 to 50.

2. The composition of claim 1 which when cured has a Shore D hardness at room temperature of at least 75; a Gardner impact for a 1/8 inch thick specimen of at least 40 inch/pounds.

3. The composition of claim 1 which when cured has a tensile strength as determined according to ASTM D-638 of at least 12,000 pounds per square inch.

4. The composition of claim 3 which when cured retains at least 70 percent of its tensile strength after a 1000 hour exposure to a Weather-O-Meter according to ASTM D-1499-64.

5. The composition of claim 1 which when cured has less than an 18 percent increase in haze when subjected to 100 cycles on a Taber abrader using a CS-10F abrasion wheel at 500 grams of weight.

6. The composition of claim 1 in which the equivalent ratio of (B) plus (D) to (C) is within the range of 0.8 to 4.0/1.

7. The composition of claim 1 in which the cycloaliphatic polyisocyanate is a diisocyanate containing cyclohexyl moiety.

8. The composition of claim 7 in which the diisocyanate is 4,4'-methylene-bis-(cyclohexyl isocyanate).

9. The composition of claim 8 in which the 4,4'-methylene-bis-(cyclohexyl isocyanate) is in a stereo:isomer ratio of 55 percent trans and 45 percent cis.

10. The composition of claim 1 in which (B) is a hydroxyterminated alkylene diol containing from 2 to 10 carbon atoms.

11. The composition of claim 10 in which the alkylene diol is selected from the class consisting of ethylene glycol, 1,4-butanediol and 1,6-hexanediol.

12. The composition of claim 1 in which (C) is an aliphatic triol.

13. The composition of claim 12 in which the aliphatic triol is selected from the class consisting of trimethylolpropane and trimethylolethane.

14. The composition of claim 1 in which the polycarbonate diol has a molecular weight of 700–2000.

15. The composition of claim 14 in which the polycarbonate diol is a poly(alkylenecarbonate) diol in which the alkylene groups contain from 5 to 10 carbon atoms.

16. The composition of claim 15 in which the alkylene moiety of the poly(alkylenecarbonate) diol is a cycloalkylene moiety.

17. The composition of claim 16 in which the cycloalkylene moiety is cyclohexyl.

18. The composition of claim 15 in which the alkylene moiety of the poly(alkylenecarbonate) diol is a mixed moiety selected from linear alkylene and cycloalkylene moieties.

19. The composition of claim 18 in which the cycloalkylene moiety is cyclohexyl dimethyl moiety.

20. The composition of claim 18 in which the mixed alkylene moieties are hexyl and cyclohexyl dimethyl moieties.

21. A polyurethane composition substantially free of ether linkages characterized by being heat curable to yield hard, impact-resistant articles having a Shore D hardness at room temperature of at least 75, said articles having a heat distortion temperature according to ASTM D-648 of at least 190° F. (88° C.) and showing no visual change when exposed to ultraviolet light in accordance with ASTM G-25-70, comprising the reaction product of:
(A) 4,4'-methylene-bis(cyclohexyl isocyanate),
(B) a low molecular weight active hydrogen-containing material selected from the class consisting of ethylene glycol, 1,4-butanediol and 1,6-hexanediol and mixtures thereof,
(C) trimethylolpropane; the equivalent ratio of (A) to (B) and (C) being about 1 to 1, the equivalent ratio of (B) to (C) being within the range of 0.5 to 10/1; said reaction product having a calculated weight percentage of urethane linkages of at least 20 percent, a calculated molecular weight between branch points of 600–4000 and the percentage by weight of the cycloaliphatic structural units being within the range of 45 to 50.

* * * * *